United States Patent

[11] 3,612,403

| [72] | Inventor | Samy Baghdadi<br>Speedway, Ind. |
|---|---|---|
| [21] | Appl. No. | 42,678 |
| [22] | Filed | June 2, 1970 |
| [45] | Patented | Oct. 12, 1971 |
| [73] | Assignee | General Motors Corporation<br>Detroit, Mich. |

[54] VARIABLE-AREA DUCT
4 Claims, 3 Drawing Figs.

[52] U.S. Cl. .................................................. 239/265.37
[51] Int. Cl. ...................................................... B64c 9/38
[50] Field of Search ........................................... 239/265.11,
265.19, 265.25, 265.27, 265.29, 265.31, 265.33,
265.35, 265.37, 265.39, 265.41; 60/228, 229, 230

[56] References Cited
UNITED STATES PATENTS
2,669,834  2/1954  Helms ........................... 239/265.39

2,780,056  2/1957  Colley ........................... 239/265.41
FOREIGN PATENTS
1,002,116  8/1965  Great Britain ................. 239/265.39

*Primary Examiner*—Lloyd L. King
*Assistant Examiner*—Thomas C. Culp, Jr.
*Attorneys*—Paul Fitzpatrick and Jean L. Carpenter ABSTRACT: A variable-area diffusing duct in a gas turbine engine is of generally annular cross section and has provision for varying the area of the duct by varying the average diameter of one or the other or both walls of the duct. The arrangement for varying the area involves a circumferentially stepped diameter construction of the duct wall and movable wall units overlying portions of the duct wall and movable circumferentially of the duct to increase or decrease the relative portion of the greater and lesser diameter portions of the duct wall.

PATENTED OCT 12 1971

3,612,403

INVENTOR.
Samy Baghdadi
BY
Paul Fitzpatrick
ATTORNEY

VARIABLE-AREA DUCT

The invention herein described was made in the course of work under a contract of subcontract thereunder with the Department of Defense.

DESCRIPTION

My invention relates to variable-area ducts and particularly to such ducts as may be used in gas turbine engines for diffusing or nozzle purposes. In an arrangement according to my invention, a duct wall has circumferentially alternating portions or greater and less diameter and is provided with circumferentially movable wall units which may overlie to a greater or lesser extent one or the other of the greater or less diameter portions of the wall. Thus, by moving these wall portions circumferentially of the duct, the total area of the duct is varied. The principles and practice of my invention may find application in such structures as supersonic, transonic, or subsonic diffusers or nozzles in engine inlets, combustion chamber inlets, engine outlets, and jet nozzles, for example.

The principal object of my invention is to provide a simple and easily constructed reliable arrangement for varying the area of a duct, particularly a converging or diverging duct which may act as a diffuser of a gas flow.

The nature and advantages of my invention will be clear to those skilled in the art from the accompanying description of a preferred embodiment of the invention and the accompanying drawings.

Figure 2:
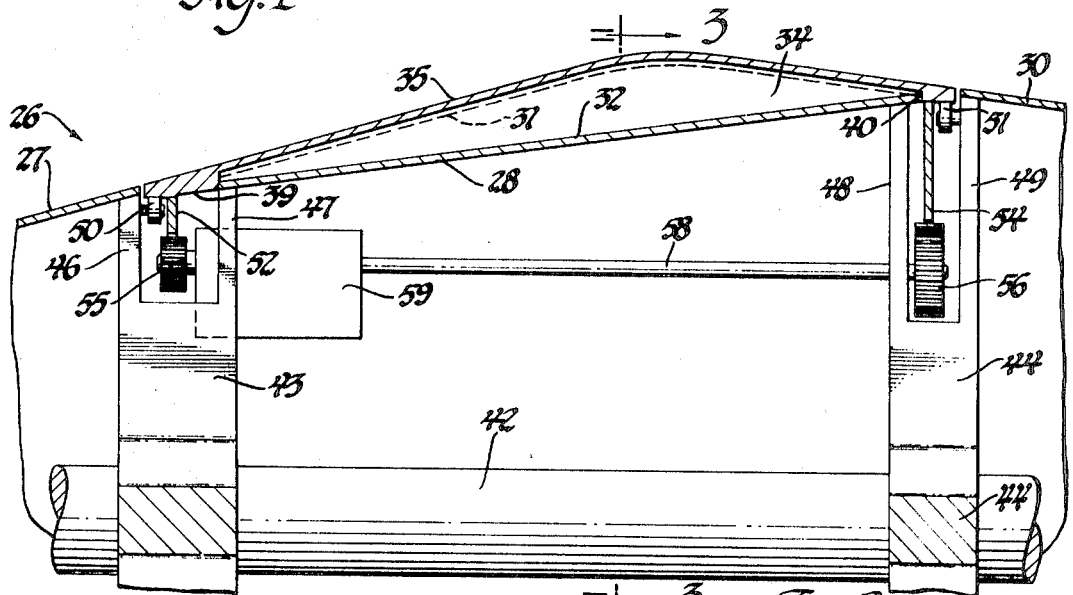
FIG. 2 is a sectional view of a variable diffuser taken on a plane containing the axis of the diffuser, as indicated by the line 2—2 in FIG. 3.

FIG. 2 is a schematic view of a turbojet engine of generally known type. The engine 2 includes an air inlet 3 between an engine case 4, which defines the outer wall of the air inlet duct, and an inlet spike or centerbody 6 which defines the inner wall of the duct. The engine illustrated includes an axial flow compressor 7, a diffuser 8 at the outlet of the compressor combustion apparatus 10, and an axial flow turbine 11 connected through a shaft 12 to drive the rotor of compressor 7. The turbine discharges into an annular outlet between an outer wall 14 and an inner wall or tailcone 15, the latter being supported by struts 16. The outer wall 14 terminates in a diverging exhaust nozzle 18.

Such an engine operates by drawing air through the inlet, compressing it in the compressor, heating it in the combustion apparatus, using the heated combustion products to drive the turbine, which drives the compressor and exhausts hot gas under pressure. This gas flowing through the nozzle 18 provides a propulsive jet for an aircraft or other vehicle.

Figure 1:
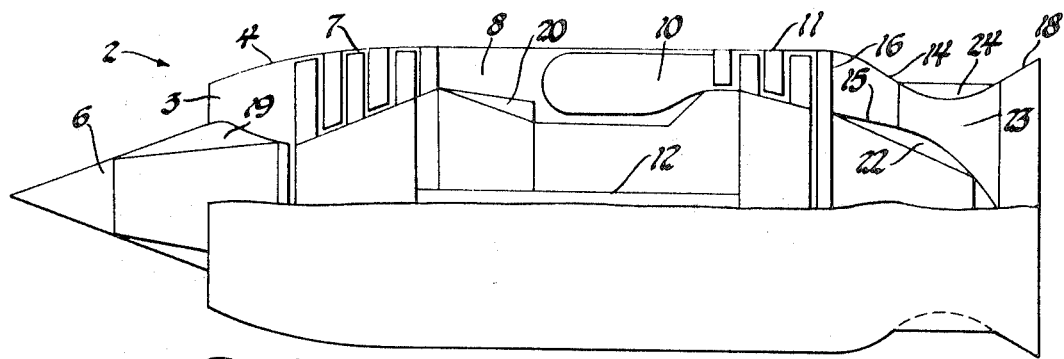
FIG. 1 is a somewhat schematic elevation view of a turbojet engine with parts cut away and in section.

FIG. 1 illustrates various locations in the engine in which a variable-area duct or diffuser according to my invention might be employed. Specifically, a variable inner wall arrangement 19 is provided in the air inlet 3, a variable inner wall at 20 provides for variation of the diffusion into the combustion apparatus, variable tailcone wall 22 provides for change in the area of the exhaust nozzle throat at 23, and a variable-area outer wall arrangement at 24 may alternatively, or together with the variable wall 22, serve the same purpose.

It is to be understood that these several applications for a diffuser are illustrative and, moreover, that it would not be expected that all of them would be used in any particular engine.

FIG. 2 illustrates a structural arrangement for providing a variable average diameter wall for a variable-area duct in a converging-diverging inner wall similar to the air inlet inner wall arrangement 19 of FIG. 1.

Figure 3:
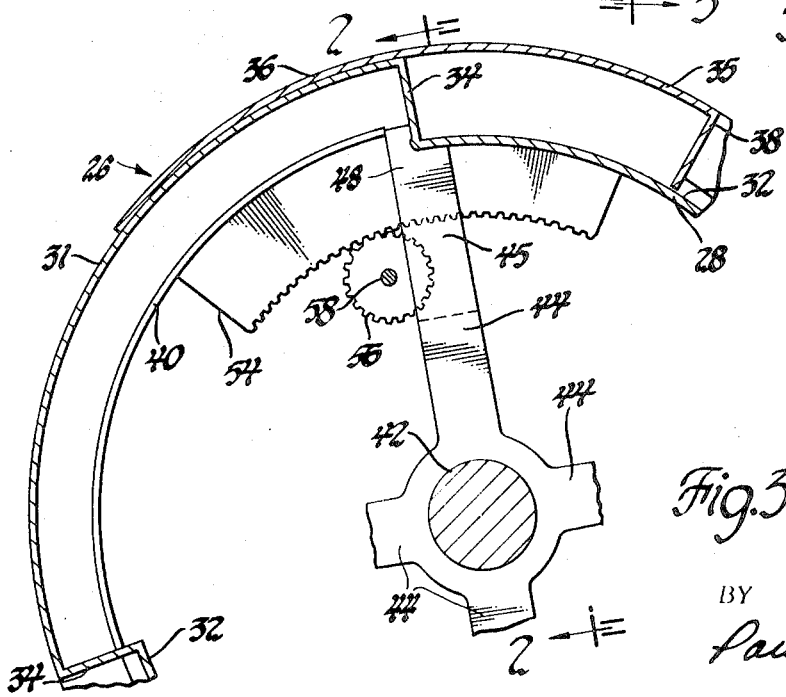
FIG. 3 is a partial transverse sectional view of the same taken on the plane indicated by the line 3—3 in FIG. 2.

It is to be understood that the inner wall of FIGS. 2 and 3 may be used with an outer wall such as the wall 4 of the air inlet duct or the wall 14 of the nozzle as shown in FIG. 1.

Referring now particularly to FIGS. 2 and 3, the inner duct wall 26 comprises a forward portion 27, an intermediate portion 28, and a rear portion 30, in the direction of assumed flow through the duct. The direction of flow could, of course, be opposite. The intermediate portion 28 is made up of four circumferentially alternately disposed sections, two sections 31 of larger diameter and two sections 32 of smaller diameter, the sections 31 and 32 being essentially the same diameter at the ends of the intermediate portion, but the larger diameter portion bulging intermediate the ends as indicated in FIG. 2. The sections 28 in this particular embodiment are conical, being largest at the rear end. Radial wall portions 34 join the edges of the sections 31 to the adjoining edges of the sections 32. Thus, the wall sections and portion 31, 32, and 34 define a continuous duct wall including portions of relatively greater diameter and portions of relatively smaller diameter, the portions relatively of smaller diameter thus defining a larger width duct between them and the outer wall of the duct.

It will be understood, of course, that it might be desirable in many cases to use a larger number of alternating larger and smaller diameter wall sections. Also, the variable wall might be a duct outer wall, in which case the inner wall might be variable, be of fixed geometry, or be omitted.

The variation of the configuration of the wall and, therefore, of the duct area is effected by movement of movable wall units, each comprising an arcuate bulging circumferential wall portion 36, adapted to overlie and slide circumferentially on the corresponding wall portion 31, and a radial wall portion 38 which extends from the portion 35 into sliding or substantially touching contact with the lesser diameter wall portion 32 of the fixed inner wall.

The two or more movable wall units 35 are coupled together through a forward unison ring 39 and a rear unison ring 40. These rings are rotatable concurrently about the axis of the duct.

The inner wall structure in the embodiment shown is supported by a central fixed shaft or strut 42 which bears a set of radially extending arms 43 and a set of radially extending arms 44. Preferably, in the structure shown, there are four arms in each set of arms 43 and 44. Arms 43 include a forward portion 46 which supports the forward wall portion 27 and a rear portion 47 which supports the front edge of the intermediate wall portion 28. Likewise, arms 44 include a portion 48 extending to support the fixed wall structure and a portion 49 extending to support the rear wall section 30. The shaft or strut 42 may be suitably supported in the engine by means immaterial to the present invention as, for example, by struts extending across the duct upstream or downstream of the structure illustrated.

To rotate the movable wall units around the axis defined by shaft 42 and thus change the area of the duct, an actuating arrangement is coupled to the ends of each movable wall unit through the two unison rings 39 and 40. These unison rings are mounted for rotation upon rollers 50 and 51 mounted on the arms 43 and 44, respectively. Each unison ring bears an internal gear sector 52 or 54. Sector 52 is driven by a pinion 55 and sector 54 by pinion 56, these pinions being mounted on a shaft 58 which is rotated by any suitable power actuator such as an electric or hydraulic motor 59. Any suitable means to cause the actuator to operate may be employed and the means for powering the actuator and determining the stopping point of the movable wall units is immaterial to my invention. The actuator 59 and shaft 58 may be suitably supported upon arms 43 and 44.

As shown in FIG. 3, the gear 56 and corresponding gear 55 may be rotated counterclockwise to drive the sectors counterclockwise around strut 42 and thus move the movable wall unit counterclockwise to a point at which the wall portion 38 is against or substantially against the wall portion 34. In this position, the movable wall units take up substantially no part of the area of the gas duct. By rotating the shaft 58 in the opposite direction, the movable wall units 35 are moved to gradually obstruct more and more of the duct area and, at a maximum, may be moved to a position where they entirely bridge the gap or smaller diameter portion, the two then providing a maximum area of the center body and thereby minimum area of the duct.

It will be apparent that structures similar to that illustrated in detail may be employed for the actuation of other movable wall arrangements to provide a variable duct area.

The detailed description of the preferred embodiment of the invention for the purpose of explaining the principles thereof is not to be considered as limiting or restricting the invention, since many modifications may be made by the exercise of skill in the art without departing from the scope of the invention.

What is claimed is:

1. A variable-area duct comprising, in combination, a wall defined by alternating arcuate wall sections of two different radii and generally radially and longitudinally extending wall portions connecting the margins of the wall sections and a movable wall unit overlying one of said wall sections and one of said wall portions and means mounting the wall unit for movement circumferentially of the duct over the said one of said wall sections so that the wall unit moves toward and away from the said one of said wall portions to vary the effective angular extent of the adjacent wall section and thereby the area of the duct.

2. A duct as defined in claim 1 in which the wall is defined by a plural number of wall sections of each radius and a movable wall unit is provided for each wall unit of one radius.

3. A variable-area duct of generally annular cross section comprising, in combination, an outer wall and an inner wall, one of said walls being defined by alternating arcuate wall sections of two different radii and generally radially and longitudinally extending wall portions connecting the margins of the wall sections, and comprising a movable wall unit overlying one of said wall sections and one of said wall portions and means mounting the wall unit for movement circumferentially of the duct over the said one of said wall sections so that the wall unit moves toward and away from the said one of said wall portions to vary the effective angular extent of the adjacent wall section and thereby the area of the duct.

4. A duct as defined in claim 3 in which the wall is defined by a plural number of wall sections of each radius and a movable wall unit is provided for each wall unit of one radius.